United States Patent
Viswanath et al.

(10) Patent No.: US 8,009,584 B1
(45) Date of Patent: Aug. 30, 2011

(54) SYSTEM AND METHOD FOR IMPLEMENTING AN IRC ACROSS MULTIPLE NETWORK DEVICES

(75) Inventors: Somnath Viswanath, San Jose, CA (US); Marufa Kaniz, Santa Clara, CA (US)

(73) Assignee: GLOBALFOUNDRIES, Inc., Grand Cayman (KY)

( * ) Notice: Subject to any disclaimer, the term of this patent is extended or adjusted under 35 U.S.C. 154(b) by 3542 days.

(21) Appl. No.: 09/877,120

(22) Filed: Jun. 11, 2001

(51) Int. Cl.
*H04L 12/28* (2006.01)

(52) U.S. Cl. ............... 370/254; 370/400; 370/395.31

(58) Field of Classification Search .......... 370/389, 370/392, 401, 402, 254, 255, 400, 395.31 370/395.32, 395.54, 352, 353, 355, 357
See application file for complete search history.

(56) References Cited

U.S. PATENT DOCUMENTS

| | | | | |
|---|---|---|---|---|
| 5,583,928 A | * | 12/1996 | Tester et al. | 379/221.03 |
| 5,751,954 A | * | 5/1998 | Saito | 709/245 |
| 5,802,316 A | * | 9/1998 | Ito et al. | 709/249 |
| 6,069,895 A | * | 5/2000 | Ayandeh | 370/399 |
| 6,075,776 A | * | 6/2000 | Tanimoto et al. | 370/254 |
| 6,496,484 B1 | * | 12/2002 | Suzuki | 370/254 |
| 6,665,702 B1 | * | 12/2003 | Zisapel et al. | 718/105 |
| 6,732,184 B1 | * | 5/2004 | Merchant et al. | 709/238 |
| 6,873,602 B1 | * | 3/2005 | Ambe | 370/254 |

OTHER PUBLICATIONS

Harry Newton, Newton's Telecom Dictionary, Jan. 1998, Telecom books and Flatiron, 13 edition, p. 108-109.*

* cited by examiner

*Primary Examiner* — Ian N Moore
(74) *Attorney, Agent, or Firm* — Harrity & Harrity, LLP

(57) ABSTRACT

A system includes a plurality of network devices and an external memory. Each network device includes an address table. The external memory includes a group of address tables corresponding to the address tables of the network devices. The system monitors the address table associated with each of the network devices, detects whether one of the address tables has been updated, and updates the corresponding address table in the external memory in response to detecting an update to one of the address tables.

10 Claims, 6 Drawing Sheets

330

SYSTEM AND METHOD FOR IMPLEMENTING AN IRC ACROSS MULTIPLE NETWORK DEVICES

TECHNICAL FIELD

The present invention relates generally to communication systems and, more particularly, to a system and method for implementing an internal rules checker (IRC) across multiple network devices.

BACKGROUND ART

In computer networks, a number of network stations are typically interconnected via a communications medium. For example, Ethernet 802.3 is a commonly used local area network (LAN) scheme in which multiple stations are connected to a shared or dedicated serial data path. These stations often communicate with a switch or some other network device located between the data path and the stations connected to that path. The switch typically controls the communication of packets and includes logic for receiving and forwarding packets to their appropriate destinations.

A common problem in conventional network switches occurs when a network switch receives a packet during a time in which the switch's resources are too busy to process the packet. Such processing may include, for example, an address lookup operation. During these times, the network switch may either delay packet processing until such time that resources become available or drop the packet.

DISCLOSURE OF THE INVENTION

There exists a need for a mechanism that improves packet processing during times when the primary network device is unavailable. This and other needs are met by the present invention, where an external device provides a rules checker memory that stores copies of the internal address tables stored in the network devices.

Additional advantages and other features of the invention will be set forth in part in the description that follows and in part will become apparent to those having ordinary skill in the art upon examination of the following or may be learned from the practice of the invention. The advantages and features of the invention may be realized and obtained as particularly pointed out in the appended claims.

According to the present invention, the foregoing and other advantages are achieved in part by a system that includes a group of network devices and a memory device. Each of the network devices includes an address table. The memory device is configured to store a duplicate address table for each of the address tables in the network devices.

In another implementation consistent with the present invention, a method for updating entries in a network having a group of network devices and an external memory is disclosed. Each network device includes an address table. The external memory includes a group of address tables corresponding to the address tables of the network devices. The method includes monitoring the address table associated with each of the network devices, detecting that one of the address tables has been updated, and updating the corresponding address table in the external memory in response to detecting the update.

In yet another implementation consistent with the present invention, a network device includes an address table configured to store address entries and an internal rules checker. The internal rules checker monitors the address table, detects whether the address table has been updated, and updates a duplicate address table in an external memory in response to detecting that the address table has been updated Other advantages and features of the present invention will become readily apparent to those skilled in this art from the following detailed description. The embodiments shown and described provide illustration of the best mode contemplated for carrying out the invention. The invention is capable of modifications in various obvious respects, all without departing from the invention. Accordingly, the drawings are to be regarded as illustrative in nature, and not as restrictive.

BRIEF DESCRIPTION OF THE DRAWINGS

Reference is made to the attached drawings, where elements having the same reference number designation represent like elements throughout.

BEST MODE FOR CARRYING OUT THE INVENTION

The present invention will be described with the example of a switch in a packet switched network, such as an Ethernet (IEEE 802.3) network. It will become apparent, however, that the present invention is also applicable to other packet switched systems, as described in detail below, as well as to other types of systems in general.

Switch Architecture Overview

Figure 1:
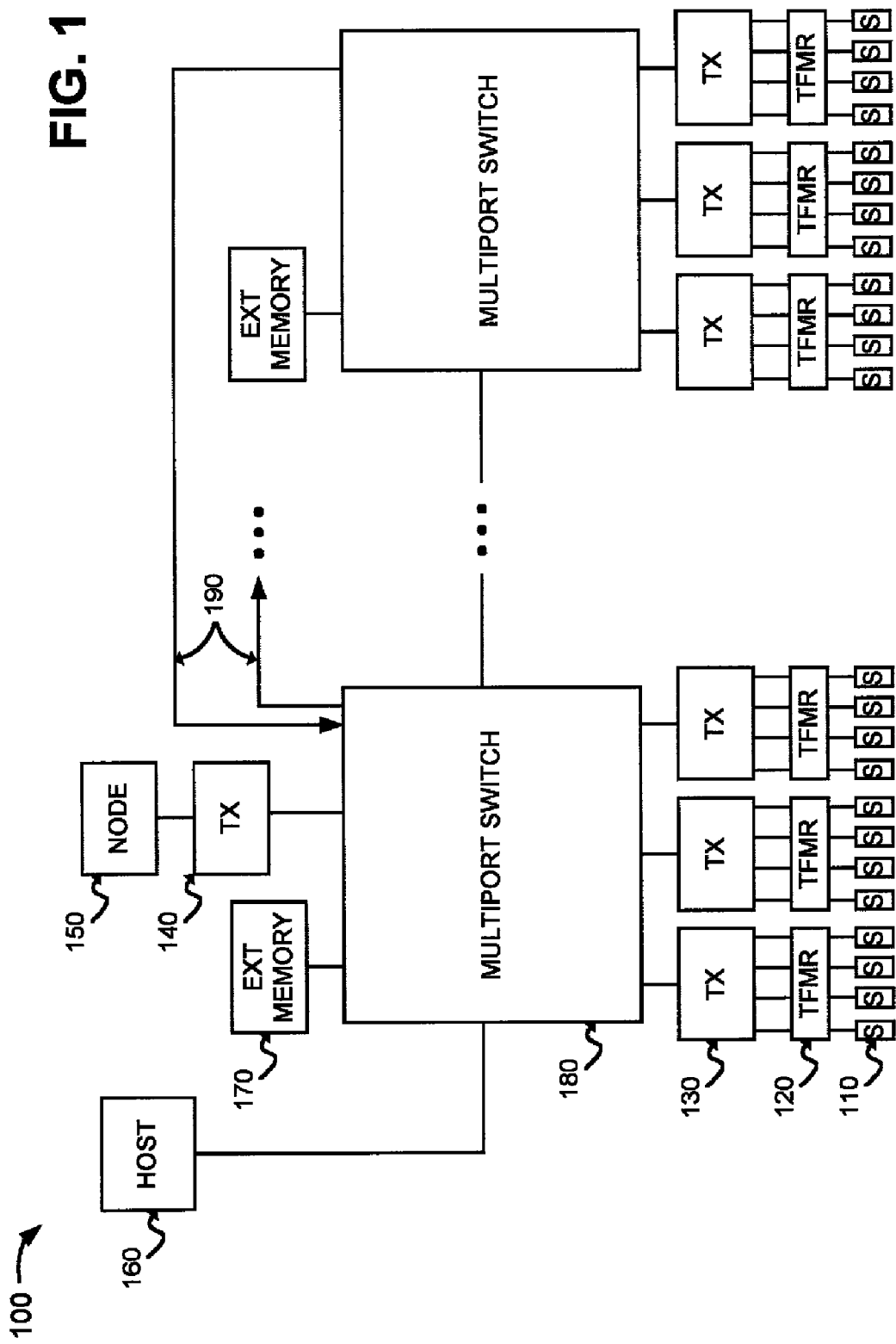
FIG. 1 is a block diagram of an exemplary system in which a system and method consistent with the present invention may be implemented.

FIG. 1 is a block diagram of an exemplary system in which systems and methods consistent with the present invention may be implemented. The exemplary system may include a packet switched network 100, such as an Ethernet (IEEE 802.3) network. The packet switched network 100 may include network stations 110, transformers 120, transceivers 130 and 140, a network node 150, a host 160, external memories 170, and multiport switches 180. The network stations 110 may include conventional communication devices, such as computers, with different configurations. For example, the devices may send and receive data at network data rates of 10 megabits per second (Mb/s) or 100 Mb/s.

Each 10/100 Mb/s network station 110 may send and receive data to and from a multiport switch 180 according to either a half-duplex or full duplex Ethernet protocol. The Ethernet protocol ISO/IEC 8802-3 (ANSI/IEEE Std. 802.3, 1993 Ed.) defines a half-duplex media access mechanism that permits all stations 110 to access the network channel with equality. Traffic in a half-duplex environment may not be distinguished over the transmission medium. Rather, each half-duplex station 110 may include an Ethernet interface card that uses carrier-sense multiple access with collision detection (CSMA/CD) to listen for traffic on the transmission medium. The absence of network traffic is detected by sensing deassertion of a receive carrier on the transmission medium.

Any station 110 having data to send may attempt to access the channel by waiting a predetermined amount of time, known as the interpacket gap interval (IPG), after deassertion of the receive carrier on the transmission medium. If multiple stations 110 are connected to the same link, each of the stations 110 may attempt to transmit data in response to the sensed deassertion of the receive carrier and after the IPG interval, possibly resulting in a collision. Hence, the transmitting station 110 may monitor the transmission medium to determine if there has been a collision due to another station 110 sending data on the same link at the same time. If a collision is detected, both stations 110 cease transmitting, wait a random amount of time, and then retry the transmission.

The 10/100 Mb/s network stations 110 that operate in full duplex mode may send and receive data packets according to the Ethernet standard IEEE 802.3u. The full duplex environment provides a two-way, point-to-point communication link enabling simultaneous transmission and reception of data packets between each link partner (i.e., the 10/100 Mb/s network station 110 and the corresponding multiport switch 180).

The transformers 120 may include magnetic transformers that provide AC coupling between the network stations 110 and the transceivers 130. The transceivers 130 may include 10/100 Mb/s physical layer transceivers that communicate with the multiport switches 180 via respective serial media independent interfaces (SMIIs) or reduced media independent interfaces (RMIIs). Each of the transceivers 130 may be configured to send and receive data packets between the multiport switch 180 and up to four network stations 110 via the SMII/RMII. The SMII/RMII may operate at a data rate sufficient to enable simultaneous transmission and reception of data packets by each of the network stations 110 and the corresponding transceiver 130.

The transceiver 140 may include one or more 1000 Mb/s (i.e., 1 Gb/s) physical layer transceivers that provide communication with nodes, such as the network node 150, via, for example, a high speed network transmission medium. The network node 150 may include one or more 1 Gb/s network nodes that send and receive data packets at a network speed of 1 Gb/s. The network node 150 may include, for example, a server or a gateway to a high-speed backbone network.

The host 160 may include a computer device that provides external management functions to control the overall operation of the multiport switches 180. The external memories 170 may include synchronous static random access memories (SSRAMs) that provide external storage for the multiport switches 180. Each of the external memories 170 may include a Joint Electron Device Engineering Council (JEDEC) pipelined burst or Zero Bus Turnaround (ZBT) SSRAM having a 64-bit wide data path and a 17-bit wide address path. The external memories 170 may be addressable as upper and lower banks of 128K in 64-bit words. The size of the external memories 170 is preferably at least 1 Mbyte with data transfers possible on every clock cycle through pipelining.

The multiport switches 180 selectively forward data packets received from the network stations 110 or the network node 150 to the appropriate destination according to the appropriate transmission protocol, such as the Ethernet protocol. The multiport switches 180 may be cascaded together (via lines 190) to expand the capabilities of the multiport switches 180.

Figure 2:
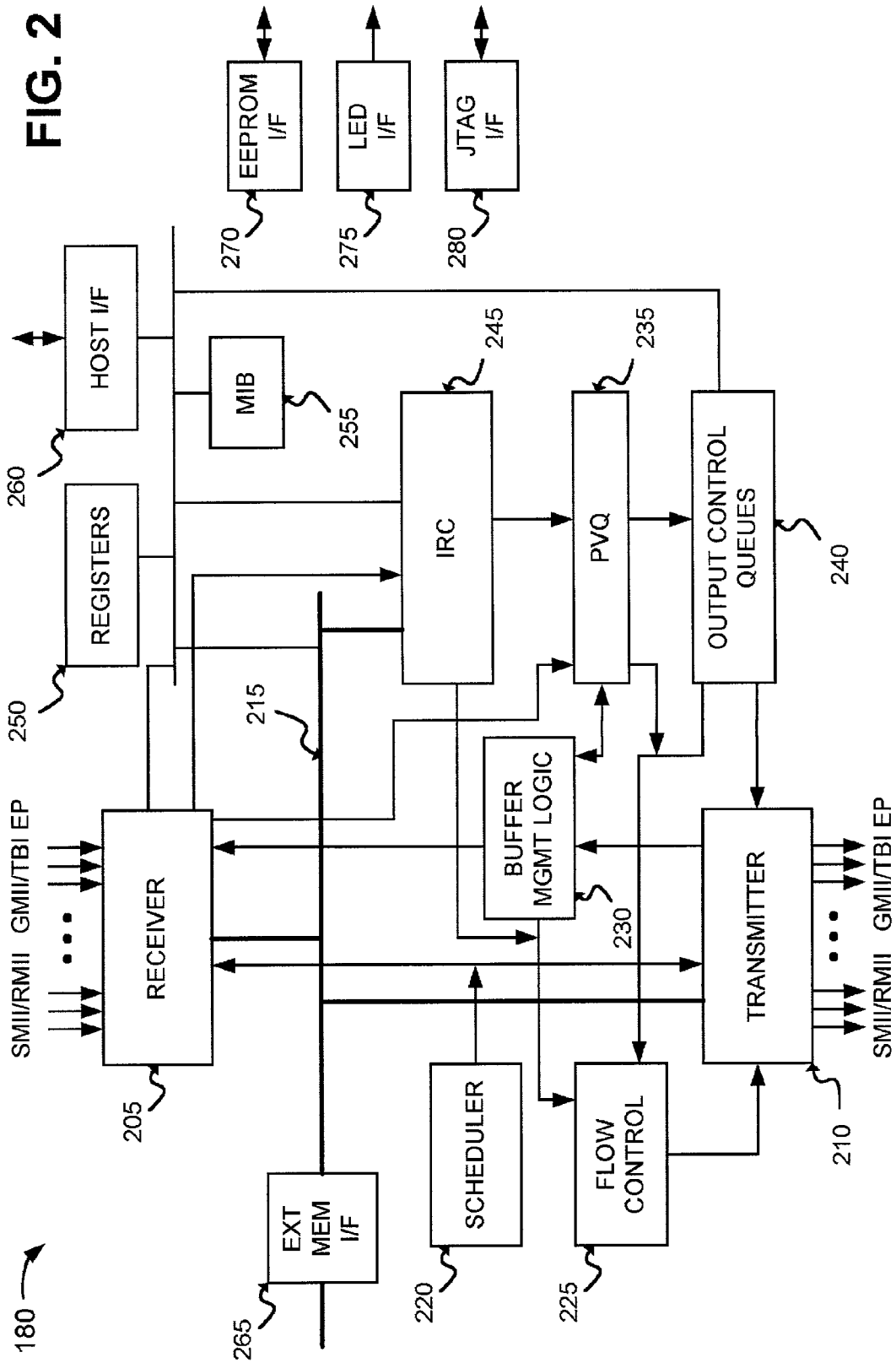
FIG. 2 is a detailed diagram of the multiport switch of FIG. 1 according to an implementation consistent with the present invention.

FIG. 2 is a detailed diagram of the multiport switch 180 according to an implementation consistent with the present invention. The multiport switch 180 may include a receiver 205, a transmitter 210, a data bus 215, a scheduler 220, flow control logic 225, buffer management logic 230, a port vector queue (PVQ) 235, output control queues 240, an internal rules checker (IRC) 245, registers 250, management information base (MIB) counters 255, a host interface 260, an external memory interface 265, an EEPROM interface 270, an LED interface 275, and a Joint Test Action Group (JTAG) interface 280.

The receiver 205 may include media access control (MAC) modules and receive buffers, such as first-in, first-out (FIFO) buffers. The receive modules may include input ports that support SMIIs, RMIIs, gigabit media independent interfaces (GMIIs), ten bit interfaces (TBIs), and proprietary interfaces for expansion with other multiport switches 180 (FIG. 1). The expansion ports (EPs) may be used to transfer data between other multiport switches 180 according to a prescribed protocol. The expansion ports may permit the multiport switches 180 to be cascaded together to form a backbone network. Each of the receive modules may include queuing logic that receives data packets from the network stations 110 and/or network node 150 and stores the packets in the corresponding receive FIFOs. The queuing logic may then send portions of the packets to the IRC 245 for processing and to the external memory 170 for storage via the external memory interface 265.

The transmitter 210 may include MAC modules and transmit buffers, such as FIFO buffers. The transmit modules may include output ports that support SMIIs, GMIIs, TBIs, and proprietary interfaces for expansion with other multiport switches 180. Each of the transmit modules may include dequeuing logic that obtains packets from the external memory 170 and stores the packets in the corresponding transmit FIFOs. The transmit modules may read the data packets from the corresponding transmit FIFOs and transmit the packets to the network stations 110 and/or network node 150. In an alternative implementation consistent with the present invention, the functions of the receiver 205 and transmitter 210 may be performed by a transceiver that manages both the receiving and transmitting of data packets.

The data bus 215 may include one or more conductors that connect the receiver 205, the transmitter 210, the IRC 245, and the external memory interface 265. The scheduler 220 may include logic that controls access to the external memory 170 by the queuing and dequeuing logic of the receiver 205 and transmitter 210, respectively. The multiport switch 180 is configured to operate as a non-blocking switch, where network data is received and transmitted from the switch ports at the respective wire rates of 10, 100, or 1000 Mb/s. Hence, the scheduler 220 may control the access by different ports to optimize use of the bandwidth of the external memory 170.

The flow control logic 225 may include logic that operates in conjunction with the buffer management logic 230, the PVQ 235, and the output control queues 240 to control the transmission of packets by the transmitter 210. The flow control logic 225 may control the transmitter 210 so that the transmitter 210 outputs packets in an efficient manner based on the volume of data traffic. The buffer management logic 230 may include logic that oversees the use of memory within the multiport switch 180. For example, the buffer management logic 230 may manage the use of frame pointers and the reuse of frame pointers once the data packet has been transmitted to its designated output port(s). Frame pointers identify the location of data frames stored in the external memory 170 that require transmission.

The PVQ 235 may include logic that obtains a frame pointer to the appropriate output queue(s) in output control queues 240 that correspond to the output ports to receive the data frame transmission. For multicopy frames, the PVQ 235 may supply multiple copies of the same frame pointer to more than one output queue. The output control queues 240 may include a FIFO-type output queue corresponding to each of the transmit modules in the transmitter 210. Each of the output queues may include multiple priority queues for frames having different levels of priority. For example, a high priority queue may be used for frames that require a lower access latency (e.g., frames for multimedia applications or management frames). The frame pointers stored in the FIFO-type output queues may be processed by the dequeuing logic for the respective transmit modules. The dequeuing logic uses the frame pointers to access the external memory 170 to read data frames at the memory locations specified by the frame pointers.

The IRC 245 may include an internal decision making engine that makes frame forwarding decisions for data packets that are received by the receiver 205. The IRC 245 may monitor (i.e., "snoop") the data bus 215 to determine the frame pointer value and a part of the data frame, for example, the header information of a received packet, including the source, destination, and virtual local area network (VLAN) address information. The IRC 245 may use the header information to determine which output port will output the data frame stored at the location specified by the frame pointer. The IRC 245 may, thus, determine that a given data frame should be output by either a single port (i.e., unicast), multiple ports (i.e., multicast), all ports (i.e., broadcast), or no port (i.e., discarded).

For example, each data frame may include a header that identifies the source and destination addresses. The IRC 245 may use the destination address to identify the appropriate output port to output the data frame. The frame header may also include VLAN address information that identifies the frame as information destined to one or more members of a group of network stations 110. The IRC 245 may alternatively determine that a data frame should be transferred to another multiport switch 180 via the expansion port.

Therefore, the IRC 245 determines whether a frame temporarily stored in the external memory 170 should be output to a single output port, multiple output ports, no output port, or another multiport switch 180. The IRC 245 may make its forwarding decision based on information stored in an IRC address table.

The IRC 245 may output its forwarding decision to the PVQ 235 in the form of a forwarding descriptor. The forwarding descriptor may include, for example, a priority class identifying whether the data frame is high priority or low priority, a port vector identifying each output port that should transmit the frame, the input port number, or VLAN information. The PVQ 235 may decode the forwarding descriptor to obtain the frame pointer. The PVQ 235 may then supply the frame pointer to the appropriate output queues within the output control queues 240.

The IRC 245 may also perform layer 3 filtering. For example, the IRC 245 may examine each received data packet for up to 128 programmable patterns and process the packet based on the result. The result may dictate that the IRC 245 drop the packet, forward the packet to the host 160, or assign a user priority or a Differentiated Services Code Point (DSCP) to the packet. User priorities and the DSCP may be independently mapped into output priority classes.

The registers 250 may include configuration and status registers used by the host interface 260. The MIB counters 255 may provide statistical network information in the form of MIB objects for use by the host 160. The host interface 260 may include a standard interface that permits an external management entity, such as the host 160, to control the overall operation of the multiport switch 180. The host interface 260 may decode host accesses within a prescribed register space and read and write configuration and status information to and from the registers 250. The registers 250, MIB counters 255, host interface 260, receiver 205, data bus 215, output control queues 240, and IRC 245 may be connected via a host bus 262.

The external memory interface 265 may include a standard interface that permits access to the external memory 170. The external memory interface 265 may permit external storage of packet data in the external memory 170 in a direct memory access (DMA) transaction during an assigned time slot determined by the scheduler 220. In an implementation consistent with the present invention, the external memory interface 265 operates at a clock frequency of at least 66 MHz and, preferably, at a frequency of 100 MHz or above.

The EEPROM interface 270 may include a standard interface to another external memory, such as an EEPROM. The LED interface 275 may include a standard interface to external LED logic. The LED interface 275 may send the status of conditions of the input and output ports to the external LED logic. The LED logic may drive LED display elements that are human-readable. The JTAG interface 280 may include a standard interface to external testing equipment to permit, for example, a boundary scan test to be performed on the multiport switch 180.

The foregoing description of the switch architecture provides an overview of the switch operations in a packet switched network. A more detailed description of the features of the present invention as associated, for example, with the multiport switch 180 is provided below.

The present invention is directed to improving the performance of a group of network devices, such as a group of multiport switches 180. An external IRC memory is provided that stores copies of the IRC address tables contained within the group of multiport switches 180.

Figure 3:
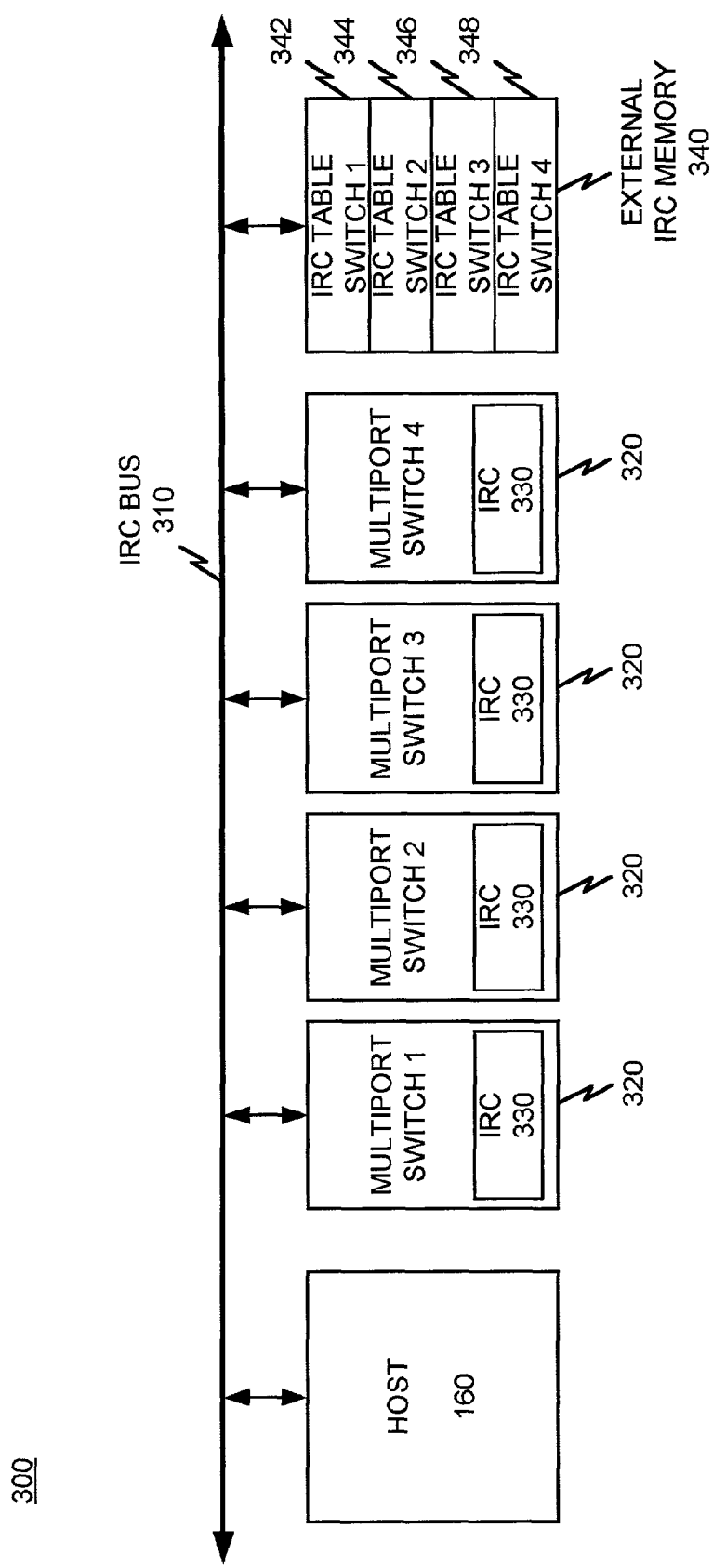
FIG. 3 is an exemplary implementation of the external IRC memory of the present invention.

FIG. 3 is an exemplary implementation 300 of the external IRC memory of the present invention. In FIG. 3, a host 160 connects to a group of multiport switches 320 and an external IRC memory 340 via an IRC bus 310. The host 160, as described above with respect to FIG. 1, may include a computer device that provides external management functions to control the overall operation of the multiport switches 320. The IRC bus 310 may include one or more conventional buses that allow for data to be transmitted between the host 160, the multiport switches 320, and the external IRC memory 340.

The multiport switches 320 may be configured in a manner similar to the multiport switches 180 described above with respect to FIG. 2. The number of multiport switches 320 illustrated in FIG. 3 is provided for simplicity. It will be appreciated that system 300 may include more or less multiport switches 320 than illustrated.

Figure 4:
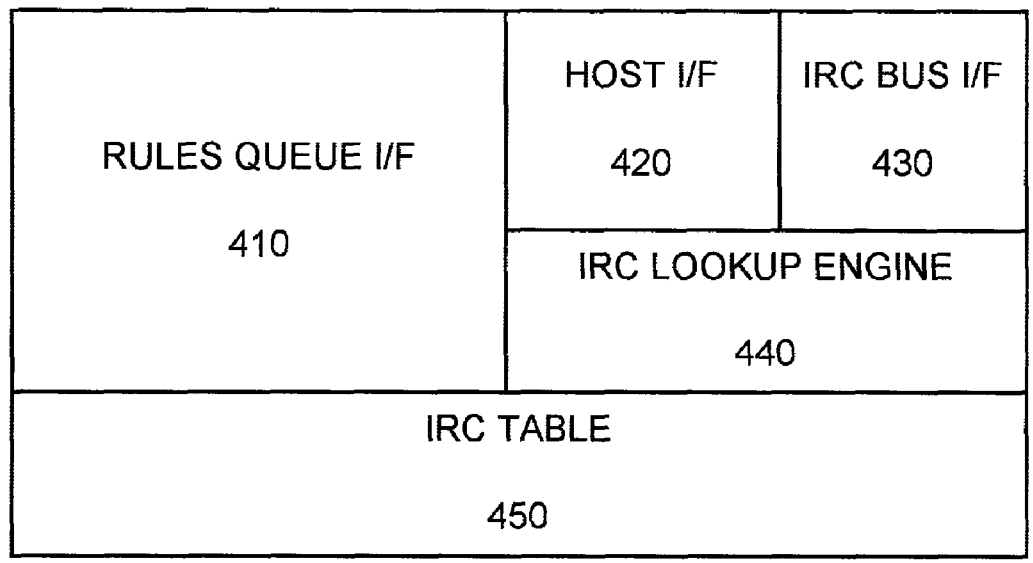
FIG. 4 is an exemplary diagram of the IRC of FIG. 3.

Each multiport switch 320 includes an IRC 330. FIG. 4 is an exemplary diagram of the IRCs 330 of FIG. 3. The IRC 330 includes a rules queue interface 410, a host interface 420, an IRC bus interface 430, an IRC lookup engine 440, and a local IRC table 450. The rules queue interface 410 permits data to be transferred between the IRC 330 and a rules queue (not shown). The host interface 420 provides for communication of information between the host 160 and the IRC 330 and provides temporary storage of data to be transferred to the host 160 or data received from the host 160. The IRC bus interface 430 provides temporary storage of data to be transferred via the IRC bus 310. The IRC lookup engine 440 may include one or more devices for performing a source and/or destination address lookup operation. Upon receiving a frame header, the IRC lookup engine 440 may compare the source and destination addresses in the frame header to addresses in the IRC table 450 to determine how to forward the frame.

The IRC table 450 includes a group of address entries containing information that allows the IRC lookup engine 440 to make a forwarding decision. Each entry may contain the following information: a static bit, a hit bit, a traffic capture bit, a virtual local area network (VLAN) index field, a receive port number field, a port vector field, a MAC address field, and a next pointer field.

The static bit may prevent aging logic (not shown) associated with the multiport switch 320 from deleting the entry from the IRC table 450. When the static bit is set by the host 160, the aging logic does not age the entry. The hit bit may be used for address aging. Whenever the IRC lookup engine 440 finds a source address or VLAN index match or creates a new entry in the IRC table 450, the lookup engine 440 sets the hit bit. The aging logic may periodically poll the hit bit of all the entries in the IRC table 450. If both the hit bit and the static bit are clear, the aging logic may age (i.e., delete) the entry. If, on the other hand, the hit bit is set and the static bit is clear, the aging logic may clear the hit bit.

The traffic capture bit may identify traffic capture MAC source and destination addresses for mirroring MAC communications to a management queue. The VLAN index field may be used to reference a VLAN identifier. The receive port number field may be used to identify the port on which the associated MAC address resides. The port vector field may include the forwarding descriptor, for a particular destination address/VLAN index match, identifying the ports to which the frame should be forwarded. The MAC address field may be used for matching the source address/VLAN index/receive port number and destination address/VLAN index of a received frame. The MAC address may be unicast, multicast, or broadcast. The next pointer field may store a pointer to the next entry in a chain of entries associated with searching the IRC table 450.

Returning to FIG. 3, the external IRC memory 340 may include one or more memory devices capable of storing IRC tables 342-348. As illustrated, the external IRC memory 340 stores one IRC table 342-348 for each multiport switch 320. For example, IRC table 342 may be associated with multiport switch 1, IRC table 344 may be associated with multiport switch 2, etc. In an implementation consistent with the present invention, the external IRC memory 340 can support up to 16,000 unique address entries (i.e., 4,000 unique address entries from each of the four multiport switches 320). Since the external IRC memory 340 contains address tables for each of the multiport switches 320, a first multiport switch 320 may perform packet processing tasks (e.g., an address lookup operation) for a second multiport switch 320 during times when the second multiport 320 lacks the resources to perform the task. As a result, packet processing delays may be avoided.

Figure 5:
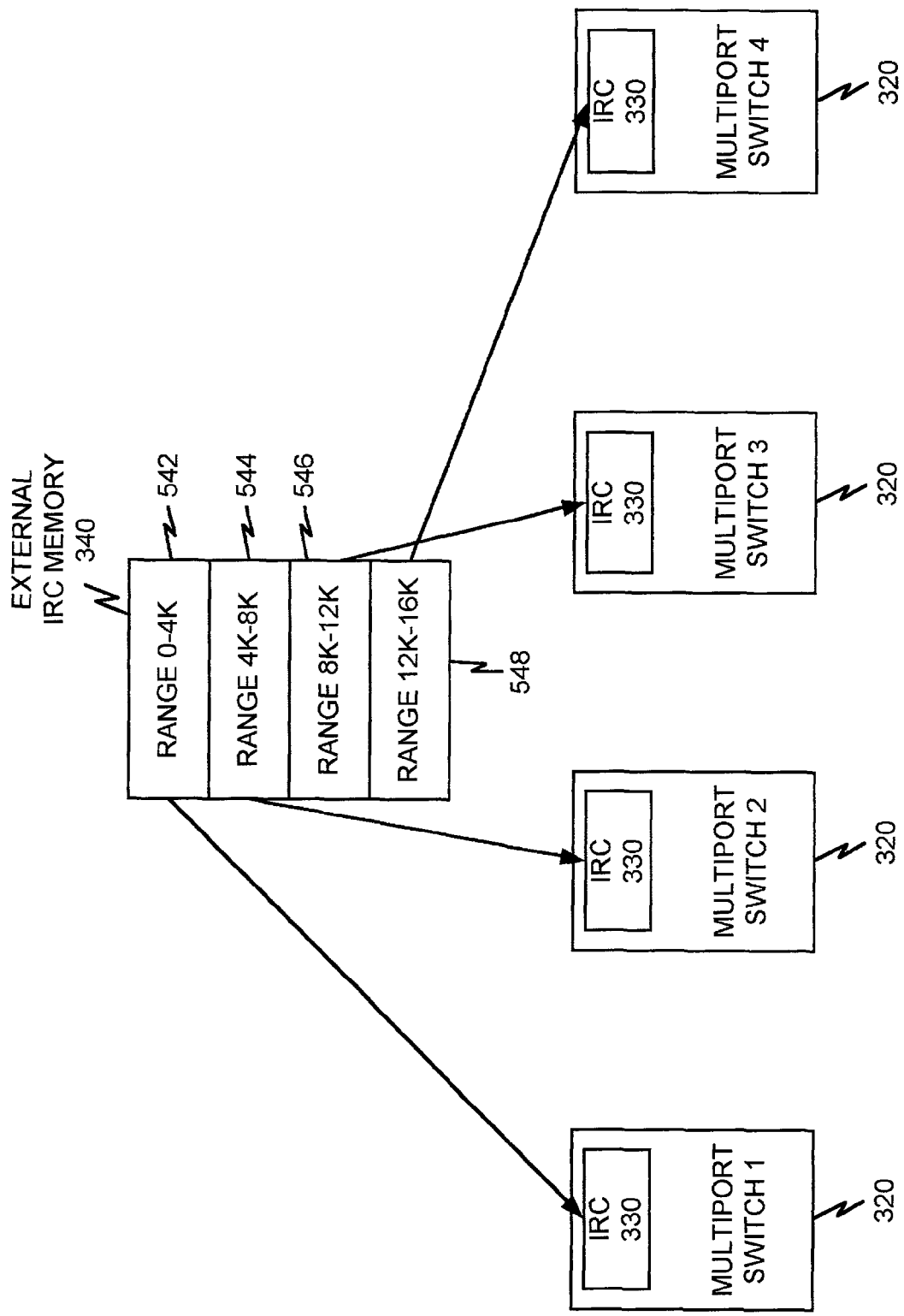
FIG. 5 is a diagram of an exemplary allocation of the external IRC memory to the multiport switches of FIG. 3.

FIG. 5 is a diagram of an exemplary allocation of the external IRC memory 340 to the multiport switches 320 of FIG. 3. In FIG. 5, the external IRC memory 340 is divided into four equal memory areas 542-548, each capable of holding up to 4000 address entries. It will be appreciated that other configurations may be possible. For example, a larger memory area may be allotted to one multiport switch 320 that includes more address entries than another multiport switch 320. As illustrated, the first 4,000 address entries 542 of the external IRC memory 340 may be assigned to the IRC 330 associated with multiport switch 1 320, the second 4,000 address entries 544 may be assigned to the IRC 330 associated with multiport switch 2 320, the third 4,000 address entries 546 may be assigned to the IRC 330 associated with multiport switch 3 320, and the fourth 4,000 address entries 548 may be assigned to the IRC 330 associated with multiport switch 4 320.

Exemplary Processing

Figure 6:
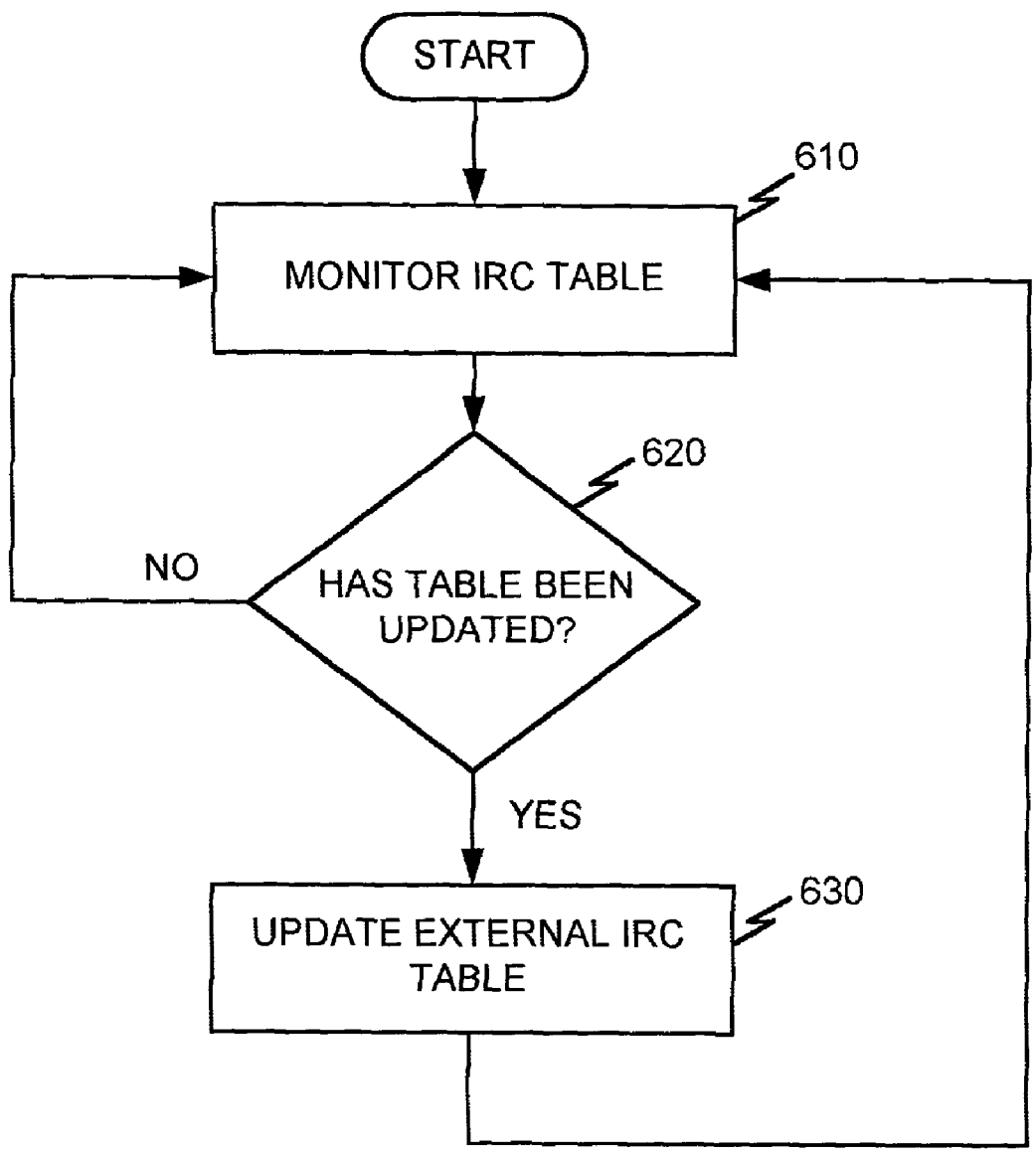
FIG. 6 is a flowchart of exemplary processing for updating an external IRC memory according to an implementation consistent with the present invention.

FIG. 6 is a flowchart of exemplary processing for updating an external IRC memory according to an implementation consistent with the present invention. Processing may begin with a network device, such as multiport switch 320, monitoring its IRC table 450 to determine whether an entry has been updated [act 610]. Each switch's 320 IRC 330 may be responsible for building its IRC table 450. For example, if an auto-learning configuration is enabled, the IRC 330 may be responsible for adding new unicast entries into the IRC table 450. If an auto-aging configuration is enabled, the IRC 330 may be responsible for removing old entries from, the IRC table 450. IRC table entries may also be added or updated by the host 160 via host interface 420.

If the multiport switch 320, or more particularly IRC 330, detects that the IRC table 450 has been updated (i.e., an entry has been added or deleted) [act 620], the IRC 330 may update the corresponding entry in its assigned section 342-348 of the external IRC memory 340 [act 630]. Assume, for example, that the IRC 330 of multiport switch 1 320 detects that the host 160 has updated an entry in its IRC table 450. Upon detecting the update, the IRC 330 updates the corresponding entry in section 342 of external IRC memory 340. As a result, the IRC 330 ensures that the entries in its IRC table 450 and the entries in its section 342 of external IRC memory 340 are identical.

As another example, assume that the IRC 330 of multiport switch 1 320 performs a learning or aging operation (i.e., the IRC 330 adds a new unicast entry or deletes an old entry). The IRC 330 may automatically add or delete the corresponding entry in its assigned section 342 of external IRC memory 340. Alternatively, the host 160 may detect the change to the IRC address table 450 of multiport switch 1 320 and update the appropriate entry in IRC switch table 342. In either case, the changes to an IRC address table are duplicated in the external IRC memory 340.

Described has been a system and method for implementing an external IRC memory in a network. Advantages of the present invention include the ability to increase packet processing throughput by allowing an alternate multiport switch to perform packet processing tasks during times when the primary multiport switch is busy. For example, if one IRC lookup engine 440 is busy, a second IRC engine 440 in another switch may perform a lookup for that switch by accessing the external IRC memory 340.

Only the preferred embodiments of the invention and a few examples of its versatility are shown and described in the present disclosure. It is to be understood that the invention is capable of use in various other combinations and environments and is capable of modifications within the scope of the inventive concept as expressed herein. For example, while a series of acts has been described with respect to FIG. 6, the order of the acts may be varied in other implementations consistent with the present invention. No element or act used in the description of the present application should be construed as critical unless explicitly described as such.

The scope of the invention is defined by the claims and their equivalents.

What is claimed is:

1. A system comprising:
a plurality of network devices, each network device including an address table, at least one of the address tables in the plurality of network devices being different from another one of the address tables in the plurality of network devices, the plurality of network devices including multiport switches; and
a memory device configured to store a duplicate address table for each of the plurality of network devices.

2. The system of claim 1 further comprising:
a bus that interconnects each of the network devices with the memory device.

3. The system of claim 1 wherein each of the network devices is configured to:
update its address table, and
automatically update the corresponding duplicate address table in the memory device.

4. The system of claim 1 wherein each of the network devices is configured to:
monitor its address table,
determine whether the address table has been updated, and
automatically update the corresponding duplicate address table in the memory device when the address table has been updated.

5. The system of claim 1 wherein the address table includes an internal rules checker address table.

6. The system of claim 1 further comprising:
a host configured to update the address table of at least one of the plurality of network devices, and
wherein the at least one of the plurality of network devices updates, in response to the host updating the at least one address table, the corresponding duplicate table in the memory device.

7. The system of claim 6 further comprising:
a bus configured to interconnect the plurality of network devices, the memory device, and the host.

8. The system of claim 1 wherein each of the plurality of network devices is configured to:
detect an addition of a new entry in its address table, and
write the new entry to the corresponding duplicate address table of the memory device.

9. The system of claim 1 wherein each of the plurality of network devices is configured to:
detect a deletion of an entry in its address table, and
delete the entry from the corresponding duplicate address table of the memory device.

10. A system comprising:
a plurality of network devices, each network device including an address table;
a memory device configured to store a duplicate address table for each of the plurality of network devices; and
an internal rules checker configured to perform an address search using the duplicate address table from the memory device that corresponds to the address table of the respective network device.

* * * * *